United States Patent
Henry

(10) Patent No.: US 7,457,037 B2
(45) Date of Patent: Nov. 25, 2008

(54) TRANSPARENT POLARIZING OPTICAL PRODUCTS AND FABRICATION THEREOF

(75) Inventor: David Henry, Morigny-Champigny (FR)

(73) Assignee: Corning Incorporated, Corning, NY (US)

(*) Notice: Subject to any disclaimer, the term of this patent is extended or adjusted under 35 U.S.C. 154(b) by 312 days.

(21) Appl. No.: 10/951,746

(22) Filed: Sep. 27, 2004

(65) Prior Publication Data

US 2006/0066947 A1 Mar. 30, 2006

(51) Int. Cl.
*G02B 5/30* (2006.01)

(52) U.S. Cl. .................. 359/486; 359/490; 359/491; 359/900

(58) Field of Classification Search ............. 359/486, 359/491, 502, 900, 490
See application file for complete search history.

(56) References Cited

U.S. PATENT DOCUMENTS

| | | | | |
|---|---|---|---|---|
| 2,320,375 A * | 6/1943 | Moulton | ............ | 359/492 |
| 2,400,877 A | 5/1946 | Dreyer | | |
| 3,588,216 A * | 6/1971 | Bloom | ............ | 359/352 |
| 3,711,417 A * | 1/1973 | Schuler | ............ | 252/585 |
| 4,648,925 A | 3/1987 | Goepfert et al. | ............ | 156/153 |
| 4,683,253 A | 7/1987 | Miyake et al. | ............ | 523/442 |
| 5,064,712 A | 11/1991 | Fretz, Jr. | ............ | 428/212 |
| 5,096,520 A * | 3/1992 | Faris | ............ | 156/99 |
| 5,286,419 A | 2/1994 | Van Ligten et al. | ............ | 264/1.3 |
| 5,286,420 A | 2/1994 | Claussen | ............ | 264/1.3 |
| 5,412,505 A | 5/1995 | Van Ligten et al. | ............ | 359/483 |
| 6,268,961 B1 * | 7/2001 | Nevitt et al. | ............ | 359/488 |
| 6,506,480 B2 * | 1/2003 | Liu et al. | ............ | 428/201 |
| 6,535,333 B1 * | 3/2003 | Piepel et al. | ............ | 359/453 |
| 6,650,473 B2 * | 11/2003 | Nakagoshi | ............ | 359/490 |
| 6,807,006 B2 * | 10/2004 | Nakagoshi | ............ | 359/490 |
| 6,975,455 B1 * | 12/2005 | Kotchick et al. | ............ | 359/487 |
| 7,123,319 B2 * | 10/2006 | Broer et al. | ............ | 349/86 |
| 2001/0028435 A1 | 10/2001 | Evans et al. | ............ | 351/163 |
| 2001/0038438 A1 | 11/2001 | Beeloo et al. | ............ | 351/162 |
| 2002/0080488 A1 * | 6/2002 | Nakagoshi | ............ | 359/488 |
| 2006/0061862 A1 * | 3/2006 | Mi et al. | ............ | 359/486 |

* cited by examiner

*Primary Examiner*—Ricky D Shafer
(74) *Attorney, Agent, or Firm*—Robert P. Santandrea; Siwen Chen

(57) ABSTRACT

Disclosed is a polarizing, transparent optical product, the structure of which comprises a basic transparent substrate of an inorganic or organic material and, on at least one part of the external surface of said basic substrate, a polarizing coating. Said polarizing coating is fixed, in a stable manner, to said substrate and has a stratified structure which includes: a polymer layer, which is fixed to the external surface of said substrate, directly or via a coupling under-layer; a film of colorant(s) having polarizing properties, on said polymer layer; and a protective layer on said film of colorant(s). Also disclosed is a method of manufacturing such a polarizing, transparent optical product. The invention may be used for any type of substrate material, inorganic or organic, thermoplastic or thermoset.

21 Claims, 2 Drawing Sheets

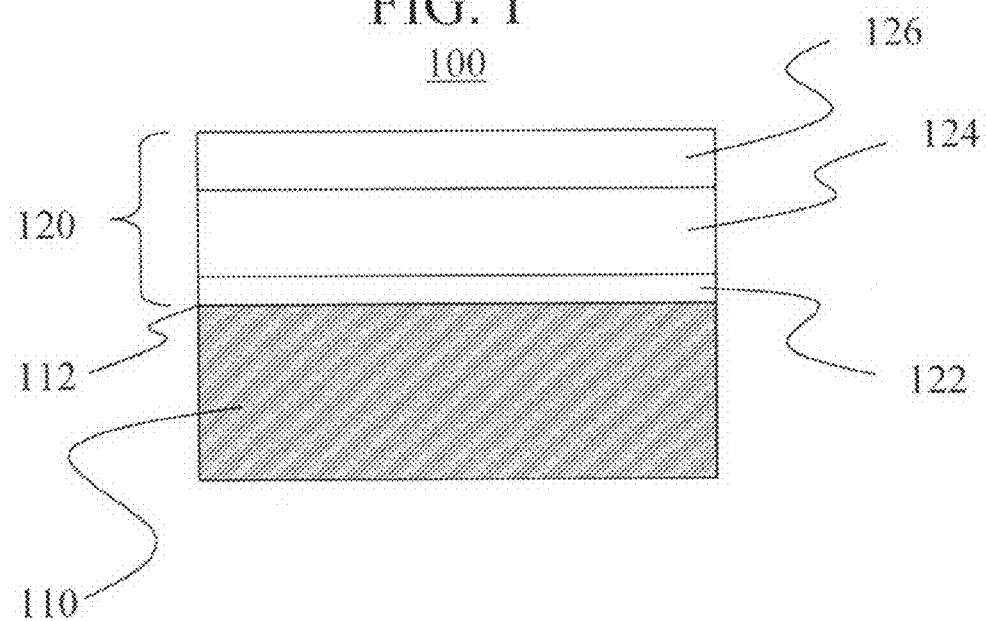
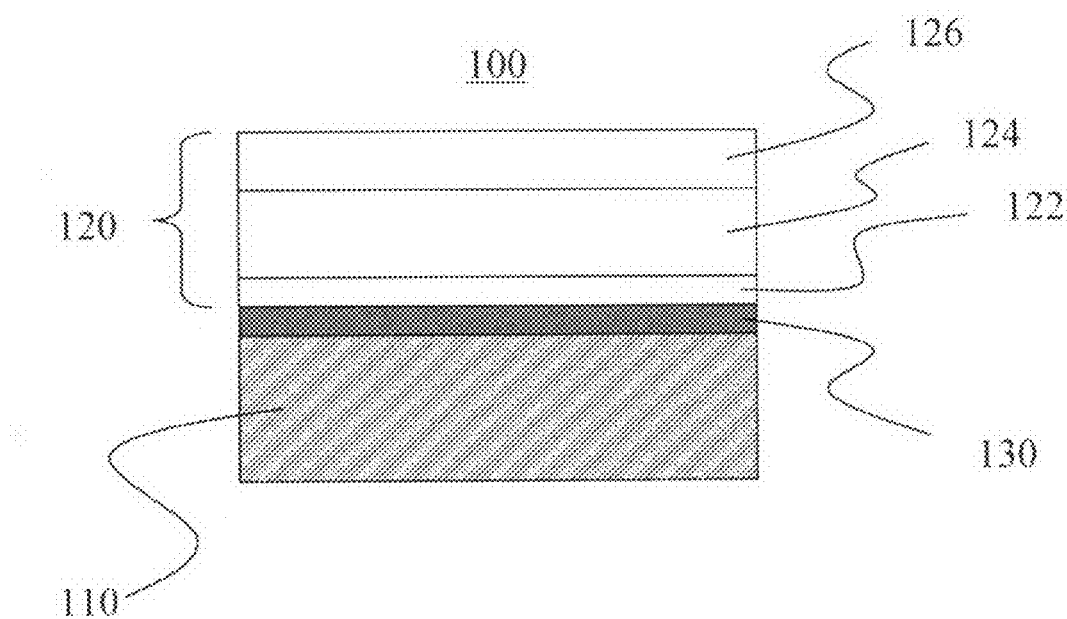

US 7,457,037 B2

TRANSPARENT POLARIZING OPTICAL PRODUCTS AND FABRICATION THEREOF

FIELD OF THE INVENTION

The present invention relates to polarizing transparent optical products and method for their fabrication. In particular, the present invention relates to transparent polarizing ophthalmic products and method for their fabrication. The present invention is useful, for example, in the manufacture of polarizing ophthalmic lenses.

BACKGROUND OF THE INVENTION

Aims of the present invention are:
polarizing, transparent optical products, which are notably useful in the spectacles trade, and which have an original structure and interesting properties; as well as
a method of manufacturing said products. This method is adaptable according to variants and is particularly interesting in that it can be qualified as a universal method (with reference to the surface of the product in question), in that it is easy to implement, and in that it can be implemented away from the site of manufacture of the products in question.

Products of this type have already been proposed according to prior art which are associated with methods of manufacture, which are more or less complex to implement.

The polarizing products of the prior art contain, in their structure, according to a first variant, a polarizing film which is based on a polymer (of poly(vinyl alcohol), polyethylene terephthalate, for example) which is drawn uniaxially and which is impregnated with at least one colorant (iodinated compounds or dichroic colorants); and according to a second variant, a film of colorant(s) having polarizing properties based on colorant(s) per se.

Two techniques have been developed within the context of the first variant. According to the first, which is described notably in WO-A-01 875 79, U.S. Pat. Nos. 5,286,419, 5,412, 505 and US-A-2001/0028435, the film of impregnated polymer is incorporated within the structure of the product, embedded in said structure. Said film, which is formed beforehand, is introduced during the manufacture of the product, on the site of manufacture of said product. This technique of manufacture of polarizing products is relatively arduous to implement. According to the second of these techniques, which is described notably in U.S. Pat. No. 5,286,420 and JP-A-09 258 009, the film of impregnated polymer is formed beforehand and then fixed, notably by adhesion, to the surface of the product. Said film is incorporated on the surface. More particularly in this context, the problem of the stability of the polymer film arises (which polymer has a tendency to relax and therefore to lose its polarizing properties) and those of the effective protection against moisture and heat, of said polymer film.

Within the context of the second variant, a film of colorant(s) having polarizing properties is generated, which is permanently orientated on a surface of the product. The following procedure is generally carried out: a lyotropic solution of at least one colorant is deposited and dried on a surface which is treated beforehand in order to have microgrooves, which are arranged in parallel. This technique and its theory are described notably in US patent U.S. Pat. No. 2,400,877. In this document, said technique is not mainly described and in any case, it is illustrated only with reference to a glass surface and to a glass substrate. The problem of the stability of the film on the surface is not raised. In this document, the production of films of colorant(s), which are flexible and peelable is also envisaged, by incorporating an intermediate film of paraffin oil, mineral oil, barium stearate or of a resin, on the glass. In the French patent applications FR-A-2,568,568 and FR-A-2,590,889, the technique of formation of microgrooves, which are parallel, on the surface of the substrate and then the deposit and the drying of a solution of colorants, in order to generate a film of colorants having polarizing properties, is taken up and improved with regard to the protection of said film generated. This film is generated directly on the surface of the substrate, which is of inorganic or organic glass. All the examples in fact concern inorganic glasses. It is easily understood that the implementation of any technique which implies the formation of the film of colorant(s) on the surface of the substrate implies an adaptability of said technique to the state of the surface of each of the substrates in question. Thus, the formation of parallel microgrooves by rubbing or brushing on the surface of organic glasses necessitates a regulation as a function of the hardness of the surface of each organic glass. Within the context of this second variant, the techniques implemented hitherto remain relatively complicated and make use of bulky equipment. Thus, they are not implemented in the prescription laboratory for the preparation of solar lenses and/or polarizing ophthalmic lenses.

In such a context, it is to the merit of the inventors to have conceived a novel type of polarizing, transparent optical product, which has good performance and which is particularly interesting in that it can be obtained by an original method of manufacture, a method:
which is easy to implement,
able to integrate touching up,
able to be implemented for the manufacture of solar lenses and/or ophthalmic lenses in the prescription laboratory for said lenses,
that can be considered universal, with reference to the surface of the product in question. Said method is in fact suitable whatever the shape is, whatever the constituent material is, and whatever the state of the surface of said surface is.

SUMMARY OF THE INVENTION

A first aspect of the present invention is thus a polarizing, transparent optical product having a structure comprising a basic transparent substrate of an inorganic or organic material and, on at least one part of the external surface of said basic substrate, a polarizing coating, wherein said polarizing coating is fixed, in a stable manner, to said substrate and has a stratified structure which includes:
a polymer layer, which is fixed to the external surface of said substrate, directly or via a coupling under-layer;
a film of colorant(s) having polarizing properties, on said polymer layer, and
a protective layer on said film of colorant(s).

Preferably, in the polarizing transparent optical product of the present invention, the side of said polymer layer covered with said film of colorant(s), contains parallel microgrooves. The polarizing coating may be bonded to the substrate via physical force or chemical bonds, preferably via chemical bonds. Preferably, the polarizing coating is fixed to the external surface of said substrate via a coupling under-layer. Preferably, the substrate is made of plastic.

The polarizing transparent optical product of the present invention can be, for example, a solar and/or ophthalmic lens, a glazing or a windscreen.

Another aspect of the present invention is a process for making a polarizing, transparent optical product, the structure of which comprises a basis transparent substrate of an inorganic or organic material and, on at least one part of the external surface of said basic substrate, a polarizing coating, wherein it comprises generating fixing, in a stable manner, to said substrate, a polarizing coating which as a stratified structure comprising:

a polymer layer, which is fixed to the external surface of said substrate, directly or via a coupling under-layer; % a film of colorant(s) having polarizing properties, on said polymer layer, and a protective layer on said film of colorant(s).

In one embodiment of the process of the present invention for making the polarizing transparent optical product, the step of generating said polarizing coating comprises the following steps:

obtaining a polymer layer having a glass transition temperature of higher than ambient temperature;

creating microgrooves, which are parallel to each other, on the side of said polymer layer intended for supporting the film of colorant(s) having polarizing properties.

In another embodiment of the process of the present invention for making the polarizing transparent optical product, the process comprises the following steps in sequence:

generating said polarizing coating of stratified structure; and depositing said polarizing coating on at least one part of the external surface of said basic structure, which is optionally coated with a coupling under-layer; and fixing, in a stable manner, said coating to said substrate.

In a preferred embodiment of the process of the present invention for making the polarizing transparent optical product, at least on part of the external surface of the basic structure, the polarizing coating is generated and fixed to the substrate. Preferably, the step of generating the polarizing coating on said substrate comprises the following steps:

optionally depositing, on at least one part of the external surface of said substrate, a layer which is intended to act as a coupling under-layer;

depositing a polymer layer having a glass transition temperature of higher than ambient temperature, directly on at least one part of the external surface of said substrate or on said layer, which is intended to act as a coupling under-layer, when it is present;

creating microgrooves, which are parallel to each other, on the external surface of said polymer layer by rubbing or brushing;

depositing a solution of colorant(s), which is (are) advantageously dichroic, on the surface of said polymer layer including the microgrooves, followed by drying said solution; and forming a protective layer of the film of colorant(s) having polarizing properties thus generated, on the surface of said polymer layer including said microgrooves; and the step of fixing of said coating to said substrate, direct or via the coupling under-layer, is obtained by at least one adequate treatment carried out before step d) and/or during step e) and/or after said step e). The treatment includes physical and chemical treatment of the surface.

The present invention has the advantages of producing polarizing transparent optical products with relative ease. The product may be produced in a ophthalmic lab in situ. The production of the product by using the process of the present invention does not involve complex process steps. The process of the present invention can be adapted for use for virtually any type of transparent substrate, inorganic or organic, thermoplastic or thermoset.

Additional features and advantages of the invention will be set forth in the detailed description which follows, and in part will be readily apparent to those skilled in the art from the description or recognized by practicing the invention as described in the written description and claims hereof.

It is to be understood that the foregoing general description and the following detailed description are merely exemplary of the invention, and are intended to provide an overview or framework to understanding the nature and character of the invention as it is claimed.

BRIEF DESCRIPTION OF THE DRAWINGS

FIG.1 is a schematic representation of a polirazing transparent optical product;

FIG.2 is a schematic representation of a polarizing transparent optical product in which a coupling layer fixes the polarizing coating to the substrate.

DETAILED DESCRIPTION OF THE INVENTION

Figure 3:
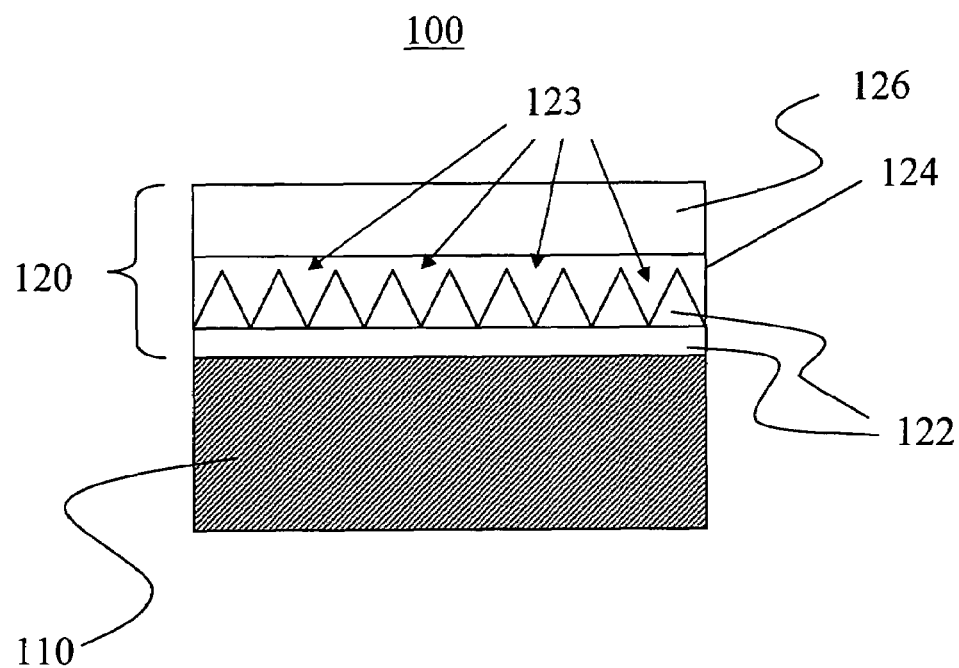
FIG.3 is a schematic representation of a polarizing transparent optical product having a polymer layer containing microgrooves.

According to a first aspect, the invention thus relates to said novel type of polarizing optical product, which is described below. According to its second aspect, the invention relates to a method of manufacturing said novel type of polarizing optical product, which is described further, below.

The polarizing, transparent optical products 100 of the invention have a structure(schematically shown in FIG.1) which classically includes a basic transparent substrate 110 of an inorganic or organic material and a polarizing coating 120 on at least one part of the external surface 112 of said basic substrate 110 (over all said external surface 112 or on only a part of it). Said polarizing coating 120 is incorporated on the external surface 112. It is not embedded in the structure.

Characteristically, said polarizing coating 120 is fixed, in a stable manner, to said substrate 110, and has a stratified structure which includes:

a polimer layer 122, which is fixed to the external surface 112 of said substrate 110, directly or via a coupling under-layer 130(FIG.2);

a film of colorant(s) 124 having polarizing properties, on said polymer layer 122, and a protective layer 126 on said film of colorant(s) 124.

Said polarizing coating 122 is anchored, in a stable manner, to the external surface 112 of the substrate 110 (over all said external surface 112 or on only a part of it). This anchoring is carried out via the polymer layer 122, which is directly or indirectly supported on the substrate 110. According to an embodimen, shown in FIG.1, the polarizing coating 120 is fixed directly onto the external surface 112 of said substrate 110 via physical and/or chemical bonds, advantageously via chemical bonds. According to another embodiment, shematically shown in FIG.2, said polarizing coating 120 is fixed to the external surface 112 of said substrate 110, via a coupling under-layer 130. These embodiments, which are adapted to the nature of the substrate in question, are developed further on in the represent text. The stable anchoring of said polarizing coating 120 to the substrate 110 is intended to avoid any delamination during the life of the product 100.

Said polarizing coating 120 of the products 100 of the invention is polarizing due to presence of a film of colorant(s) 124 having polarizing properties, within it. Such a film is known per se. It is not a polymer film which is drawn uniaxially and which is impregnated with colorant(s) in the sense of the documents WO A 01 87579, U.S. Pat Nos. 5,286,419, 5,412,505, US A 2001/0028435 or documents U.S. Pat. No. 5,286,420 and JP A 09 258 009, but is film of colorant(s) in the sense of documents U.S. Pat. No. 2,400,877, FR A 2,568,586 and FR A 2,590,889; i.e. a priori, almost exclusively only including the colorant(s) in question. According to a preferred embodiment of the invention, said film of colorant(s) 124 is obtained by a technique which is described in said documents U.S. Pat. No. 2,400,877, FR A 2,590,889 and the polymer layer 122 of the polarizing coating 120 (more specifically, its "upper" face in contact with the film of colorants) includes the marks of said technique: microgrooves 123 which are arranged in parallel. In order for these microgrooves 123 to remain, they are generated on a polymer (a polymer layer 122) having a glass transition temperature higher than ambient temperature.

Mention has been made, with reference to the prior art and to the invention, of the incorporation of colorant(s), the incorporation of at least one colorant, notably within films of colorant(s) having polarizing properties. The plural is needed, i.e. the joint incorporation of the several colorants is often necessary in order to confer a neutral colouration, notably to said films. However, this result can also be attained with certain colorants which are used alone. Thus, the films having polarizing properties of the invention can include one or more colorants.

The colorant(s) in question can make up 100% of the film having polarizing properties, but are in general incorporated in a mixture with additives, notably of a plastifying type, surfactant type or dichroism reinforcement additive type. Such additives are never incorporated at more than 10% by weight within said film. Additives of this type, more particularly of the surfactant or dichroism reinforcement additive type, which can therefore be incorporated within the films of colorant(s) having polarizing properties of the polarizing coating of the invention, have been described in the US patent U.S. Pat. No. 5,286,419, with reference to polarizing films of the impregnated drawn polymer type.

The film of colorant(s) having polarizing properties which is incorporated in the structure of the polarizing coatings of the invention is, as indicated above, known per se. Also in a way known per se, said film is protected by a protective layer. It is thus found encapsulated between the substrate, more specifically the polymer layer and the protective layer. This protective layer is in fact often a multi-layer, e.g. of a type such as those described in documents FR-A-2,568,568 and FR-A-2,590,889. This protective layer ensures a protection against time, moisture and temperature.

The person skilled in the art cannot ignore the fragility of the films of colorant(s) in question.

Characteristically, in the structure of the polarizing coatings of the invention, said protected film of colorant(s) is not incorporated directly on the surface of the subject to be polarized. It is positioned on a polymer layer, which is itself anchored to said surface of said substrate. This polymer layer constitutes the key of the invention. It enables, in the manufacture of the products of the invention, being exempt from the surface of the substrates in question (it can be said that it constitutes a "scar" layer) and also from the nature of the material constituting the substrate. It confers a universal character to said process already mentioned and explains the possibility of touching up during the implementation of said process.

Once the nature of the polymer constituting the polymer layer in question is selected and the anchoring of said layer is mastered, directly or via a coupling under-layer, on substrates, the manner in order to render them polarizing can be mastered for many substrates. The polymer layer is referred to in singular form. However, its meaning of course is generic. The scar layer which supports the film of colorant(s) having polarizing properties can be based on polymer(s) and/or on copolymer(s), of mono-layer or multi-layer structure. All these variants should be covered in the present invention as claimed.

Characteristically, the products of the invention are thus polarizing due to the incorporation of a film of colorant(s) having polarizing properties on the surface of a polymer layer which is fixed to their surface. It can be said that an intermediate layer is incorporated.

The nature of the materials in question can now be specified in a totally non-limiting way.

The basic substrate is an inorganic or organic material. Advantageously, it is a glass. More advantageously, it is an organic glass. Said organic glass can notably be selected from the cross-linked and non-crosslinked, thermoplastic and thermoset materials obtained from compositions which comprise monomers of the following type: diglycol diallyl carbonate, styrene monomers, (meth)acrylic monomers, and the like, and thermoplastic and/or thermoset plastic materials such as polycarbonates, polyurethane-ureas, polythiourethanes, cyclic polyolefins, polyesters, cellulose materials and polysulphones.

Notably in the context of the spectacles trade, the basic substrate is advantageously an organic glass the refractive index of which is between 1.48 and 1.75, preferably between 1.50 and 1.67.

Any polymer (cross-linked or not) is suitable for the object of the invention (as intermediate layer between the substrate and the film of colorants) on two conditions:
  that it can be fixed in a stable manner on the surface of the substrate; and
  that it can support, even enable generating and supporting, the film of colorant(s) having polarizing properties, without deterioration of said properties.

The fixing (anchoring) of the polymer layer can result from a physical treatment, selected notably from treatments with hot air, treatments with flame, corona treatments, plasma treatments, ionising radiation treatments, UV radiation treatments and laser excimer treatments. It can also result from a chemical treatment, e.g., from an oxidising treatment type, a treatment with a strong base or a surface functionalization treatment. The implementation of physical and chemical treatment is not excluded. It has been seen that the fixing could be done via physical force and/or chemical bonds.

With reference more particularly to the chemical bonds, a coupling under-layer (SS) can be incorporated between the substrate (S) and the polymer layer (P). A chemical coupling, which is mainly of the S-P type or the S-SS-P type, can therefore be had.

In a totally non-limiting manner, it can be indicated that the polymer layer is preferably an aromatic structure. Similarly, it can be indicated that said layer is generally based:
  on a polymer of the following type: poly(vinyl acetate) or derivative; polystyrene; poly(meth)acrylic; saturated or unsaturated polyester; cellulose; polycarbonate; polysulphone; polyamide; polyimide; polysiloxane; phenol or formophenol resin; aminoplast; or epoxy resin;
  on a corresponding copolymer (obtained from the monomers corresponding to the polymers listed above); or
  on a mixture of such polymers and/or copolymers (including at least two polymers, two copolymers or at least one polymer and at least one copolymer).

The polymer layer, which is of one of the types above, or even of another type, can be bound chemically to the substrate:

intrinsically: if the polymer in question intrinsically includes at least one reactive function (which is present at the end of the chain, in its chain or on a side group);

because said polymer has been functionalised beforehand: reactive functions have been introduced beforehand into its formula; and/or via a coupling under-layer.

It is specified in a totally non-limiting way that said coupling under-layer can notably be based on silanes, e.g., on alkoxysilanes and/or chlorosilanes or on compositions with reactive groups of the following types: vinyl, epoxy, isocyanate, hydroxyl, amine, thiol, carboxylic acid and/or anhydride. Such compositions can include reactive groups of a single type (e.g., isocyanate) or reactive groups of at least two of the types above, which are obviously non-reactive with each other (e.g., isocyanate and vinyl); from where the "and/or" above comes.

For example, stable fixings of the following type: S-P or S-SS-P, via chemical bonds, are obtained via such bonds of the following type: (thio)ester, (thio)ether, siloxane, amide, (thio)urethane and/or (thio)urea. One single type of bond or several types of bond can be incorporated for the fixing of a coating, from where the "and/or" above comes.

Such a fixing does not pose any real problems to the person skilled in the art. Its implementation within the context of the invention is however innovative.

The following can be specified with reference to the second of the conditions set forth above. The polymer in question must obviously be compatible with the film of colorant(s) having polarizing properties which are incorporated on its surface. In the assumption in which said film is of the type such as those described in U.S. Pat. No. 2,400,877, FR-A-2,568,568 and FR-A-2,590,889, it is incorporated directly for the generation of said film on its surface. The microgrooves required must be able to be created on its surface. These microgrooves, which are arranged in parallel, must be able to remain; from where the need comes as to the value of the glass transition temperature, which is higher than ambient temperature, already formulated for the polymer constituting said film. Materials of wax, oil or elastomer material type are excluded, due to their low glass transition temperature value.

It has been seen above that the film of colorant(s) is known per se. The colorant(s) in question is(are) advantageously dichroic.

As regards that last stratum of the stratified structure of the polarizing coating of the invention, it is advantageously of the type such as those described in FR-A-2,590,889, i.e. that it (the protective layer) consists of a multi-layer comprising:

on the film of colorant(s), a cross-linked first layer which is based on at least one compound selected from γ-aminopropyltrimethoxysilane and γ-aminopropyltriethoxysilane;

on said first layer, a second, cross-linked layer which is based on an epoxyalkyltrialkoxysilane;

on said second layer, a third layer which forms a barrier against moisture.

Mention has been made, for the products of the invention, of a market in the spectacles trade. This market is obviously not the only one. The products of the invention are suitable for many optical articles, and notably solar lenses and/or ophthalmic lenses, lenses for optical instruments, screens (e.g. digital indicator windows which are used in electronics, instrumentation or clocks under the vocable "liquid crystal display"), filters, for glazing (for vehicles: automobiles, boats, wagons . . . , or for buildings) or for windscreens. This list is not exhaustive.

The second object of the present invention is now arrived at: the manufacture of polarizing, transparent optical products, as described above (products which constitute the first object of said present invention). This method of manufacturing comprises: the generating, and the fixing, in a stable manner, to the basic transparent substrate, of the polarizing coating which has the stratified structure explained above (polymer layer+film of colorant(s) having polarizing properties+protective layer).

The technique described in U.S. Pat. No. 2,400,877, FR-A-2,568,568 and FR-A-2,590,889, is recommended for generating said polarizing coating, this technique comprising: obtaining a polymer layer having a glass transition temperature of higher than ambient temperature; and creating microgrooves, which are parallel to each other, on the side of said polymer layer intended for supporting the film of colorant(s) having polarizing properties.

This technique involves incorporating, in a manner known per se, the surface of the intermediate polymer layer (of the "scar" layer) in the preparation of the film of colorant(s) having polarizing properties.

The steps of generation and of fixing of the polarizing coating can be led successively or in parallel. They can also be led on different sites or on the same site, advantageously directly on the surface of the substrate in question.

According to a first variant, the method of the invention comprises, successively:

generating said polarizing coating of stratified structure;

depositing said polarizing coating on at least one part of the external surface of said basic substrate, which is optionally coated with a coupling under-layer; and fixing, in a stable manner, said coating to said substrate.

Within the context of this method, the polarizing coating is first of all generated, and then it is fixed, directly or via a coupling under-layer, to the basic substrate, via physical and/or chemical bonds. The type of bonds capable of being suitable between various types of constituent materials of said basic substrate and of the polymer layer of the polarizing coating, optionally via the coupling under-layer, has been seen above. Said polarizing coating can thus be generated entirely independently from the location of said basic substrate.

According to a second variant, which is preferred, the method of the invention comprises the generation of said coating and the fixing of said coating on the surface of the product in question, said two steps being carried out on said surface of said product. The coating is thus generated in situ, on its site of operation. It is constituted directly on the external surface of the basic substrate of the product in question.

Within the context of this second variant, which is preferred, the generating and fixing of the coating are advantageously carried out as follows:

generating said coating on said substrate comprises:

a) optionally depositing, on at least one part of the external surface of said substrate, a layer which is intended to act as a coupling under-layer;

b) depositing a polymer layer having a glass transition temperature of higher than ambient temperature, directly on at least one part of the external surface of said substrate or on said layer, which is intended to act as a coupling under-layer, when it is present;

c) creating microgrooves, which are parallel to each other, on the external surface of said polymer layer by rubbing or brushing;

d) depositing a solution of colorant(s), which is (are) advantageously dichroic, on the surface of said polymer layer including the microgrooves, followed by drying said solution; and e) forming a protective layer of the film of colorant(s) having polarizing properties thus generated, on the surface of said polymer layer including said microgrooves; and the stable fixing of said coating to said substrate, direct or via the coupling under-layer, is obtained by at least one adequate treatment carried out before step d) and/or during step e) and/or after said step e).

The polarizing coating is constituted layer by layer; its coupling can be made in one step or in several additional steps, in a more or less early manner. Said coupling is in general carried out in one step, during step e) or earlier between steps c) and d), even between steps b) and c) if its implementation does not create an obstacle to the formation of the microgrooves.

With regard to the preceding description, it has been understood that:

the at least one adequate treatment is selected from physical surface treatments, chemical surface treatments and their combinations, advantageously from chemical surface treatments, and that in general:

the at least one adequate treatment is a heat treatment which generates (thio)ester, (thio)ether, siloxane, amide, (thio)urethane and/or (thio)urea bonds.

The method of the invention characteristically comprises the incorporation, under the film of colorant(s) having polarizing properties, of the polymer layer.

As regards the protection of said film of colorant(s), it is advantageously implemented without deterioration of it.

Thus, in a manner known per se, step d) of the method above is advantageously followed by a step of insolubilisation, which is at least partial, of the colorant(s) deposited, when, during step e), said colorant(s) deposited can be solubilised.

It has been seen above that said step e) advantageously aims at generating a multi-layer protective layer of type such as those described in FR-A-2,590,889. Thus, said step e) advantageously comprises:

treating the substrate coated with an aqueous solution which is free from organic co-solvent and which is prepared from at least one compound selected from γ-aminopropyltrimethoxysilane and γ-aminopropyltriethoxysilane, the silane representing 0.1 to 10% by volume of the solution and the solution having a pH in the range of 10 to 11.2, this treatment being followed by a rinsing with water and a heat treatment between 80 and 140° C., and, then placing the resulting product in contact with an aqueous solution of an epoxyalkyltrialkoxysilane followed by a rinsing with water and a condensation of and/or partial polymerisation of said epoxyalkyltrialkoxysilane, and, finally applying an optically transparent layer, which is inorganic or organic, which forms a barrier against moisture, and its stabilisation by a heating phase at a high temperature or under UV irradiation.

Such a step e) is, as mentioned above, advantageously preceded by an insolubilisation step, which is at least partial, of the colorant(s) deposited.

The method of the invention as described above, each of the steps of which is implemented according to techniques known per se, is innovative and very advantageous.

Its implementation for obtaining polarizing lenses is particularly recommended. Within this context, its implementation is more particularly recommended according to its second variant, i.e. directly on said lenses, away from the site of manufacture of them (e.g. in the prescription laboratory of said lenses).

The invention, under its two aspects of product and method, is illustrated in a totally non-limiting manner by the following Examples.

EXAMPLE 1

A clean CR 39 (polydiethyleneglycol bis-allyl carbonate) lens was coated by applying, by centrifugation at 2,000 rpm for 95 seconds, a solution of polymer containing 5% by weight of bisphenol A polycarbonate (provided by Aldrich, $M_w$=64,000 (GPC)), and 2% by weight of γ-aminopropyltriethoxysilane, in 83% by weight of cyclohexanone.

The coated layer was then heat-treated at 120° C., for 30 minutes. This heat treatment dried it and fixed it to the lens.

The polymer coating having a perfect optical quality has a thickness of about 4 μm.

Parallel microgrooves are produced on said coating by brushing with the aid of a wheel of loaded polyurethane foam (having a shape which is appropriate to ensure a uniform brushing). Said foam is loaded with a fine aluminium powder in order to ensure a slightly abrasive brushing. The speed of the wheel is 185 rpm. Said wheel turns for 25 seconds. The pressure applied is slight.

A regular film of colorants Vari-light 2S from 3M (Polacoat®), in aqueous solution at a concentration of about 7% by weight, is then deposited with a syringe and with a centrifugation speed of 1,000 rpm for 25 seconds at an acceleration of 100 rpm. It was left to dry for a few minutes at ambient temperature.

The good effectiveness of polarization ensured by the dichroic colorant deposited was evaluated by measurement of the optical transmission by means of a spectrophotometer having a polarized source.

The film of colorants was then protected by generating a protective coating thereon. Firstly, an SHC180D resin from LTI (Lens Technology Inc) was deposited by centrifugation, in which resin a photo-initiator which is sensitive to visible light (Irgacure 819 from Ciba), had been added. Secondly, this resin which is loaded with said photo-initiator was polymerised by means of a V-bulb light from Fusion System. Use was preferably made of visible light with reference to safety and in order to avoid bleaching of the colorant.

The polymerisation of the protective coating was carried out with the V-bulb at a power of 80% and a belt speed of 0.5 m/minute.

The optical transmission of the lens obtained was measured by means of a light source which is polarized in two orientations, a first in which the transmission is maximal ($T_{//}$) and a second in which the transmission is minimal ($T_{perp}$), after having turned the lens by 90° about an axis which is normal to its surface and passing through its centre.

The following values were obtained:

$T_{//}$=15.65%

$T_{perp}$=1.52%.

The effectiveness of the polarization, which was calculated as being $100 \times [(T_{//}-T_{perp})/(T_{//}+T_{perp})]$, gave a value of 82%. The person skilled in the art cannot ignore that this effectiveness could have been improved by an optimisation of the conditions of deposit and of drying of the film of colorant.

The lens has a pleasant grey colour. Its durability was evaluated by heating for 1 week at 130° C. No loss in effectiveness of the polarization, nor a change in colour, was thus observed.

EXAMPLE 2

A vision lens of CR 39 (polydiethyleneglycol bis-allyl carbonate), having a refractive index of 1.5, was treated by immersion in a solution containing 10% by weight of potassium hydroxide, for 10 minutes at 40° C. Then, a solution of resin SU8-50 (this is an epoxy resin marketed by the company Micro Chem. Corp.), diluted in cyclohexanone (20% solution by weight of solid), was applied by centrifugation on said lens.

This layer of resin has a glass transition temperature of 50-55° C. before cross-linking and a glass transition temperature of greater than 200° C. after cross-linking (see below).

The resin was spun at 2,500 rpm for 95 seconds.

The polymer layer obtained has a thickness of a few microns.

It has a good optical quality.

Parallel microgrooves are then produced on said polymer layer deposited, (as in Example 1) by brushing.

The polymer layer, which is marked with said microgrooves, is then cross-linked by exposure to UV light (a V-bulb lamp from Fusion System is used). A film of colorants Vari-light 2S from 3M (Polacoat®), in aqueous solution at a concentration of about 7% by weight, is then deposited.

The whole is spun at a speed of 1,000 rpm for 25 seconds with an acceleration of 100 rpm.

The coating is dried for a few minutes at ambient temperature.

The film of colorants was then protected by application, by centrifugation, of a protective layer of SHC180D loaded with photo-initiator. This layer is cross-linked with a V-bulb at a power of 80% and a belt speed of 0.5 m/minute.

The measurement of the effectiveness of the polarization gives a value of 80%.

The lens has a pleasant grey colour. Its durability was evaluated by heating it for 1 week at 130° C. No loss in effectiveness of the polarization, nor a change in colour, was thus observed.

EXAMPLE 3

The same procedure as in Example 2 was implemented from a lens having a refractive index of 1.6 and sold by the company Rodenstock under the trademark Cosmolit 1.6.

The same brushing was notably implemented.

An effectiveness of polarization of 81% was obtained.

EXAMPLE 4

The same procedure as that in Example 2 was implemented except that the CR 39 lens was coated with a polymer solution of 15% by weight of poly[(o-cresyl glycidyl ether) co-formaldehyde] sold by Aldrich (epoxy resin), 5% by weight of UVI 6990 as photo-initiator sold by Union Carbide and 80% by weight of a mixture of γ-butyrolactone/cyclohexanone.

The polymer layer obtained has a thickness of a few microns. It has a good optical quality.

The measurement of the effectiveness of the polarization gives a value of about 80%.

The lens has a pleasant grey colour. The durability test (heating for 1 week at 130° C.) does not reveal any loss of effectiveness of the polarization, or a change of colour.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A polarizing, transparent optical product, said product comprising a basic transparent substrate of an inorganic or organic material and, on at least one part of the external surface of said basic substrate, a polarizing coating, wherein said polarizing coating is fixed, in a stable manner, to said substrate and has a stratified structure which includes:
    a polymer layer, which is fixed to the external surface of said substrate, directly or via a coupling under-layer, said polymer layer having a side containing a plurality of microgrooves that are arranged parallel to each other;
    a film of at least one colorant having polarizing properties in the absence of an applied electric field, wherein said film is formed in situ directly on said side of said polymer layer containing said plurality of microgrooves, and
    a protective layer on said film of at least one colorant.

2. The product according to claim 1, wherein said polarizing coating is fixed directly onto the external surface of said substrate via at least one of physical bonds and chemical bonds.

3. The product according to claim 1, wherein said polarizing coating is fixed to the external surface of said substrate, via a coupling under-layer.

4. The product according to claim 3, wherein said coupling under-layer comprises silanes, or compositions with at least one reactive group selected from the group consisting of: vinyl groups, epoxy groups, isocyanate groups, hydroxyl groups, amine groups, thiol groups, carboxylic acid groups, and anhydride groups.

5. The product according to claim 1, wherein said basic substrate is an organic glass.

6. The product according to claim 5, wherein said basic substrate is an organic glass the refractive index of which is between 1.48 and 1.75.

7. The product according to claim 1 wherein said polymer comprises at least one polymer selected from the group consisting of: poly(vinyl acetate) or a derivative thereof polystyrene; poly(meth)acrylic; saturated or unsaturated polyester; cellulose; polycarbonate; polysulphone; polyamide; polyimide; polysiloxane; phenol or formophenol resin; aminoplast; epoxy resin; mixtures thereof; and copolymers thereof.

8. The product according to claim 1, wherein said coating is fixed to said substrate by at least one of: a (thio)ester, a (thio)ether, a siloxane, an amide, a (thio)urethane, and a (thio)urea.

9. The product according to claim 1, wherein said protective layer consists of a multi-layer comprising:
    on the film of at least one colorant, a cross-linked first layer which is based on at least one compound selected from γ-aminopropyltrimethoxysilane and γ-aminopropyltriethoxysilane;
    on said first layer, a second, cross-linked layer which is based on an epoxyalkyltrialkoxysilane;
    on said second layer, a third layer which forms a barrier against moisture.

10. The product according to claim 1, wherein the product constitutes at least one of an optical device, a solar lens, an ophthalmic lens, a glazing, or a windscreen.

11. A method of manufacturing a polarizing, transparent optical product, said product comprising a basic transparent substrate of an inorganic or organic material and, on at least one part of the external surface of said basic substrate, a polarizing coating, wherein the method comprises generating and fixing, in a stable manner, to said substrate, said polarizing coating which has a stratified structure including:

> a polymer layer, which is fixed to the external surface of said substrate, directly or via a coupling under-layer, said polymer layer having a side containing a plurality of microgrooves that are arranged parallel to each other,
>
> a film of at least one colorant having polarizing properties in the absence of an applied electric field, wherein said film is formed in situ directly on said side of said polymer layer containing said plurality of microgrooves, and
>
> a protective layer on said film of at least one colorant.

12. The method according to claim 11, wherein the generating of said polarizing coating comprises:

> obtaining said polymer layer having a glass transition temperature of higher than ambient temperature;
>
> creating said plurality of microgrooves, which are parallel to each other, on the side of said polymer layer intended for supporting the film of at least one colorant having polarizing properties.

13. The method according to claim 11, wherein it comprises, successively:

> generating said polarizing coating of stratified structure;
>
> depositing said polarizing coating on at least one part of the external surface of said basic substrate; and
>
> fixing, in a stable manner, said coating to said substrate.

14. The method according to claim 13, wherein the substrate is coated with a coupling under layer.

15. The method according to claim 11, wherein it comprises, carried out on at least one part of the external surface of said basic substrate, generating said coating and fixing said coating to said substrate.

16. The method according to claim 15, wherein:

the generating of said coating on said substrate comprises:

a) depositing, on at least one part of the external surface of said substrate, a layer which is intended to act as a coupling under-layer;

b) depositing a polymer layer having a glass transition temperature of higher than ambient temperature, directly on at least one part of the external surface of said substrate or on said layer, which is intended to act as a coupling under-layer, when it is present;

c) creating said microgrooves, which are parallel to each other, on the external surface of said polymer layer by rubbing or brushing;

d) depositing a solution of at least one colorant, which is advantageously dichroic, on the surface of said polymer layer including the microgrooves, followed by drying said solution;

e) forming a protective layer of the film of at least one colorant having polarizing properties thus generated, on the surface of said polymer layer including said microgrooves; and in that said coating is fixed to said substrate in a stable manner, directly or via the coupling under-layer, by at least one adequate treatment carried out before step d).

17. The method according to claim 16, wherein the at least one adequate treatment is selected from at least one of physical surface treatments and combinations thereof.

18. The method according to claim 16, wherein the at least one adequate treatment is a heat treatment which generates at least one of (thio)ester, (thio)ether, siloxane, amide, (thio)urethane, and (thio)urea bonds.

19. The method according to claim 16, wherein step d) is followed by a step of insolubilisation, which is at least partial, of the at least one colorant deposited, when, during step e), said at least one colorant deposited can be solubilised.

20. The method according to claim 16, wherein forming a protective layer comprises:

treating the substrate coated with an aqueous solution which is free from organic co-solvent and which is prepared from at least one compound selected from γ-aminopropyltrimethoxysilane and γ-aminopropyltriethoxysilane, the silane representing 0.1 to 10% by volume of the solution and the solution having a pH in the range of 10 to 11.2, this treatment being followed by a rinsing with water and a heat treatment between 80 and 140° C., and, then placing the resulting product in contact with an aqueous solution of an epoxyalkyltrialkoxysilane followed by a rinsing with water and a condensation of or partial polymerisation of said epoxyalkyltrialkoxysilane, and, finally applying an optically transparent layer, which is inorganic or organic, which forms a barrier against moisture and its stabilisation by a heating phase at a high temperature or under UV irradiation.

21. The method according to claim 16, wherein said coating is fixed to said substrate in a stable manner, directly or via the coupling under-layer, by at least one adequate treatment carried out before step d) and either during step e) or after step (e).

* * * * *